Oct. 7, 1969    M. HUVAL    3,471,401
METHOD OF REMOVING OIL FROM WATER CONTAINING SUSPENDED SOLIDS
Filed Sept. 29, 1967    3 Sheets-Sheet 1

INVENTOR
MALCOLM HUVAL
BY P.E. Johnston
Edward J. Keeling
ATTORNEYS

Oct. 7, 1969 M. HUVAL 3,471,401
METHOD OF REMOVING OIL FROM WATER CONTAINING SUSPENDED SOLIDS
Filed Sept. 29, 1967 3 Sheets-Sheet 3

INVENTOR
MALCOLM HUVAL
BY  P E Johnston
    Edward J Keeling
ATTORNEYS

United States Patent Office 3,471,401
Patented Oct. 7, 1969

3,471,401
METHOD OF REMOVING OIL FROM WATER CONTAINING SUSPENDED SOLIDS
Malcolm Huval, Lafayette, La., assignor to Chevron Research Company, San Francisco, Calif., a corporation of Delaware
Filed Sept. 29, 1967, Ser. No. 671,726
Int. Cl. B01d 43/00
U.S. Cl. 210—23                    2 Claims

ABSTRACT OF THE DISCLOSURE

A method of removing oil from water containing suspended oil droplets and oil-wet solids by establishing the amount of oil carried on the various sizes of solids, removing enough of the larger solids from the water so that the oil wetting the smaller solids is not enough to raise the oil concentration in the water above an allowable concentration for oil pollution purposes, passing the waste water stream including the smaller particles through a coalescing means to form large oil droplets, separating the large droplets from the water downstream of the coalescing means and disposing of the water.

---

This invention relates to methods of separating oil and water and, more particularly, this invention relates to methods of removing oil droplets from waste water containing oil-wet suspended solid particles so that the waste water may be disposed of without causing oil pollution.

A serious problem has arisen in many industries in disposing of large amounts of water containing trace amounts of oil. The problem is compounded when suspended oil-wet solids are included in the waste water. Since most solids are preferentially wet by oil, a portion of the oil in the waste water tends to adhere to the particles. Small oil droplets not adhering to solids are also present in the waste water. Heretofore, the oil in the waste water stream has been removed by chemical or mechanical means. One such mechanical means used heretofore is known as forced coalescing of the oil and involves passing the water containing small droplets of oil through a coalescing element which retards the flow of the small oil droplets and causes small oil droplets to come together to form larger droplets which are more easily separated from the water by gravity downstream of the coil coalescing element. However, a serious problem has been encountered in forced coalescing when suspended oil-wet solids are present in the waste water. The solids are often difficult to remove from the waste water. However, if some provision is not made for handling the solids, plugging of the coalescing elements or undesirably high oil content in the effluent can result.

In a broad aspect the present invention provides a method for removing oil droplets from water containing suspended solid particles so that the water may be disposed of without causing oil pollution. The method includes the steps of sampling a waste water stream to obtain a representative sample of the water including the oil concentration and the solid particles suspended therein and determining the number and size distribution of the solid particles. The volume of oil that can be carried on each size of the solid particles is established, and an allowable oil concentration in the water which is to be disposed of so that oil pollution will not result is selected. The relationship between the allowable oil concentration in the disposable water and the volume of oil that can be carried on the solid particles is determined. This relationship sets the maximum size of oil-wet particles which can remain in the disposable water without resulting in oil pollution. The particles larger than this maximum size are removed from the waste water stream, and then the waste water stream, including particles smaller than the maximum size of particles, is passed through a coalescing element to coalesce the oil droplets to provide for separation of oil and water. The effluent water containing the oil-wet small solids may then be disposed of without causing oil pollution.

A principal object of the present invention is to provide a method for removing oil droplets from water containing suspended oil droplets and oil-wet solids by forced coalescence. Further objects and advantages of the present invention will become apparent from the following detailed description read in light of the accompanying drawings which are made a part of this specification and in which.

Figure 1:
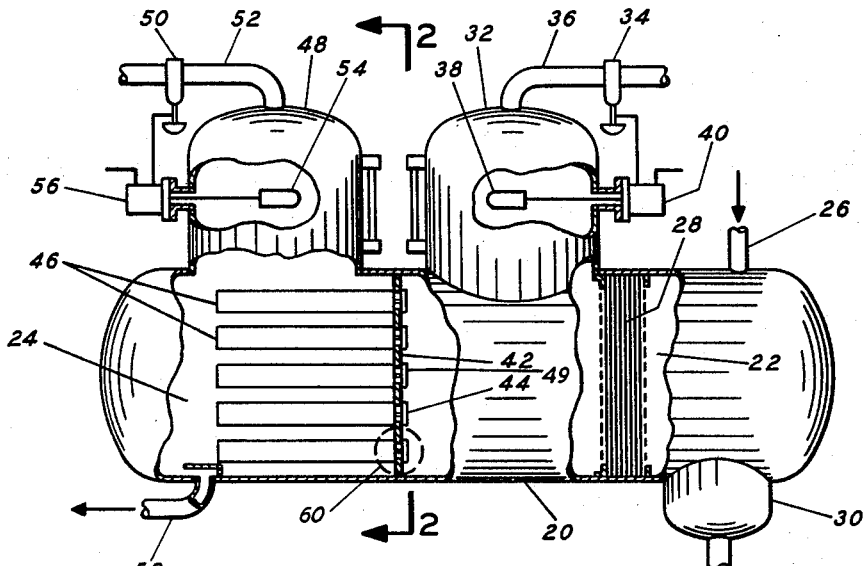
FIGURE 1 is a sectional view and illustrates the preferred embodiment of apparatus useful in the present invention.

Referring now to the drawings and specifically to FIGURE 1, the preferred embodiment of apparatus useful in accordance with the present invention is shown in sectional view. As there shown, a tank 20 is divided into a primary chamber as indicated by the numeral 22, and a secondary chamber 24. In accordance with the invention, a waste water stream containing suspended tiny oil droplets and oil-wet solid particles is directed into the primary chamber 22 of the tank 20 through a suitable inlet 26. The water is initially directed through primary filter section 28. A sand trap 30 is provided in the tank, preferably upstream of the primary filter section 28, to capture large particles of sand or the like which settle out due to velocity changes or filter action. The primary chamber 22 downstream of the filter section 28 is provided with an oil and gas trap 32 for drawing off gas and oil which may be broken out of the waste water stream due to the action of the primary filter section 28. A suitable valve 34 is provided in the outlet line 36 of the oil and gas trap 32. If desired, the valve may be automated by suitable means such as sensor 38 located in the gas trap and connected to control means 40.

A bulkhead 42 divides the primary chamber 22 and the secondary chamber 24. The bulkhead 42 has one or more openings 44 which are adapted to receive one or more coalescing elements such as coalescing elements 46. The secondary chamber 24 is also provided with an oil and gas trap 48 having a shutoff valve 50 on its outlet line 52. The secondary chamber also has a discharge 58 for drawing off disposable water from the secondary chamber.

Figure 2:
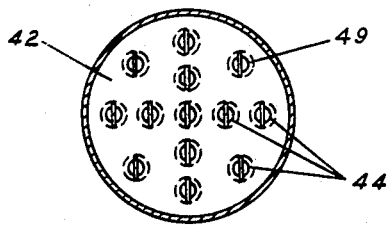
FIGURE 2 is a sectional view taken at line 2—2 of FIGURE 1.

FIGURE 2 is a sectional view taken at line 2—2 of FIGURE 1. The bulkhead 42 is provided with a number of spaced-apart openings 44. These openings 44 are adapted to receive the end of a coalescing element 46. A bar member 49 is fixedly connected across each of the openings 44 to assist in connecting the coalescing element in place. When the coalescing elements are properly connected in place, the water can only flow through the elements when moving from the primary to the secondary chambers.

Figure 3:
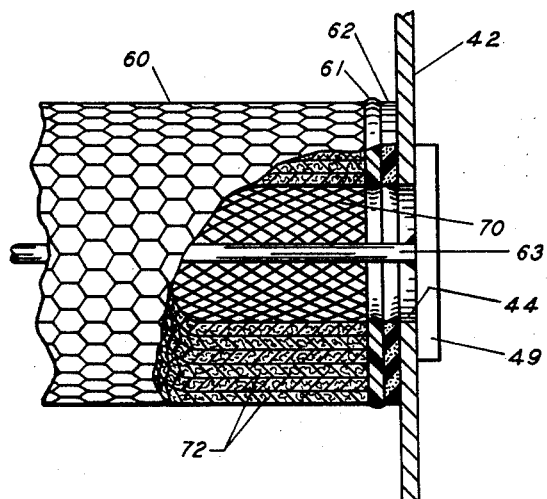
FIGURE 3 is a view with parts broken away from clarity of presentation of a portion of a coalescing element useful in the present invention.

In FIGURE 3 a portion of a coalescing element indicated as 60 in FIGURE 1 is shown in an enlarged view with portions broken away for clarity of presentation. The coalescing element is formed around a suitable core such as an expanded metal tube 70. A plurality of layers of a suitable coalescing material 72 are formed around the core 70. Suitable coalescing materials for use in the present invention include batts formed of synthetic fibers such as, for example, polyester fibers bonded together by a suitable bonding material such as a cross-linked acrylic binder. The coalescing material is preferably wrapped in successive layers around the core 70.

In accordance with the invention, waste water containing minute quantities of oil and suspended oil-wet solids is directed into the primary chamber 22 from a source of waste water such as the water draw-off line of a typical heater treater installation. As is known in the art, a heater treater is a device used to accomplish basic separation between produced oil and water. Theoretically, much of the suspended solid matter is removed from the oil and water in the heater treater, but as a practical matter, many solids in the range of from less than one micron to 50 microns and larger are found in the water being expelled from the heater treater. It is with this type of water, which also contains minute drops of suspended oil, that the present invention is concerned. Oil in quantity of from 75 p.p.m. to 500 or more p.p.m. may be found in the water. Suspended solids from 30 to 50 p.p.m. and more are also commonly found associated with the oil. The suspended solids are almost always oil-wet. That is to say, the surfaces of the solid particles are coated with an oil coating which remains with the solid even though it is in a water environment. The waste water stream, including the oil droplets and the oil-wet particles, is directed to a primary filter section 28.

The primary wafers are sized depending upon the size and oil cointent of solid particles. A sample of the waste water stream is obtained and the amount and size distribution of the solid particles are determined. One method suitable for determining the number of solids and their size distribution is by microscopic field analysis. In this method, a typical sample is viewed through a microscope and the number of particles in each size range is counted. After the number of particles in each size range is established, the volume of oil that can be carried on each size of the solid particles is determined. This may also be done by microscopic analysis of the solids in their oil-wet condition. The allowable oil concentration in the disposable water is determined by certain criteria. For example, many states have laws which prohibit disposing of water having a concentration of oil above a certain maximum limit. It has been found that disposing of water containing more than about 30–32 p.p.m. oil will cause a visible oil slick on the surface of a body of water. It is, therefore, highly desirable to maintain the concentration of oil in disposable water at a value less than about 10–15 p.p.m.

Once a suitable allowable oil concentration of the water for disposal has been determined such that oil pollution will not result, the relationship between the solids which can pass the primary filter and the solids which must be removed by the primary filter can be determined. This is done based on the relationship between the solid particles and the volume of oil carried by each particle. Since it is planned that almost all of the solid particles which pass the primary filter section will also be passed through the coalescing elements in order to prevent plugging of the coalescing elements, it is vital that the oil contained on the solid particles which will be passed through the primary filter section contain less than the allowable amount of oil in the disposable water. This is true because whether or not the particles lose their oil coating while going through the coalescing elements, they will again become oil-wet as they pass through the oil coalesced on the downstream portion of the coalescing elements; and due to their gravity, they will remain in the waste water stream which is discharged. It is believed that in effluent coalescing elements substantially the only oil which remains in the effluent water is oil carried by the solids which pass the element. Thus by predetermining the amount of oil that can be retained by the solids and selecting the number and volume of the solids that will be allowed to pass through the element, the amount of oil in the effluent can be closely controlled.

Figure 4:
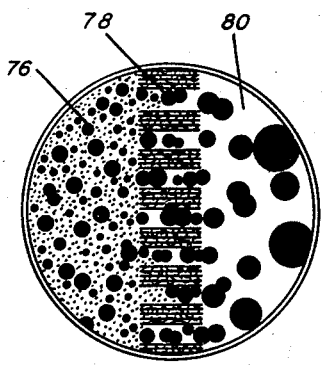
FIGURE 4 is a schematic cross section of a coalescing element and illustrates the sequence of coalescing operations as they occur through the element.

As noted above, then, the primary filter section is sized to retain particles larger than a maximum size of particles and to pass particles smaller than the maximum size range into the coalescing elements. The function of the coalescing elements is to retain minute oil droplets on the surface of the coalescing material and to cause the small droplets to become enlarged by collision with other small droplets. As schematically illustrated in FIGURE 4, as the small droplets become larger in size, they will readily float to the surface of the water from where they can be separated from the water. The disposable water is drawn off from the bottom of the tank.

The downstream end (not shown in FIGURE 3) of the coalescing elements 46 is sealed so that all flow out of the core must go through the layers of coalescing material at right angles to the longitudinal axis of the core. The upstream end of the element 46 is sealed by means of a plastic material 61 which gives a hard, flow-resistant seal. A softer resilient material 62 is used between the plastic seal 61 and the bulkhead 42 to prevent short circuiting of water around the coalescing element. A draw rod 63 fixedly connected to rod member 49 and extending parallel to the axis of the coalescing element 46 is used to hold the element in position against the bulkhead 42. A wing nut arrangement or the like is provided on the end of rod 63 beyond the end of the coalescing element to urge the element against the bulkhead in fluid-tight relationship therewith.

FIGURE 4 schematically illustrates the sequence of coalescing operations as they occur in the porous section 78 of a suitable coalescing material. Prior to flow into the initial portion of the material in the area designated by the numeral 76, the normal structure of an unstable oil-in-water emulsion is shown. Here there are typically small drops which are difficult to separate from the water. In the coalescing section 78 the tiny oil droplets are brought in contact with each other by the action of the coalescing material. The surface films of the droplets are ruptured as they go through the openings of the coalescing material. These openings have been greatly exaggerated in FIGURE 4 for purposes of illustration. In the portion of the figure designated 80, the coalesced droplets are large enough to easily separate from the water by gravity.

Figure 5:
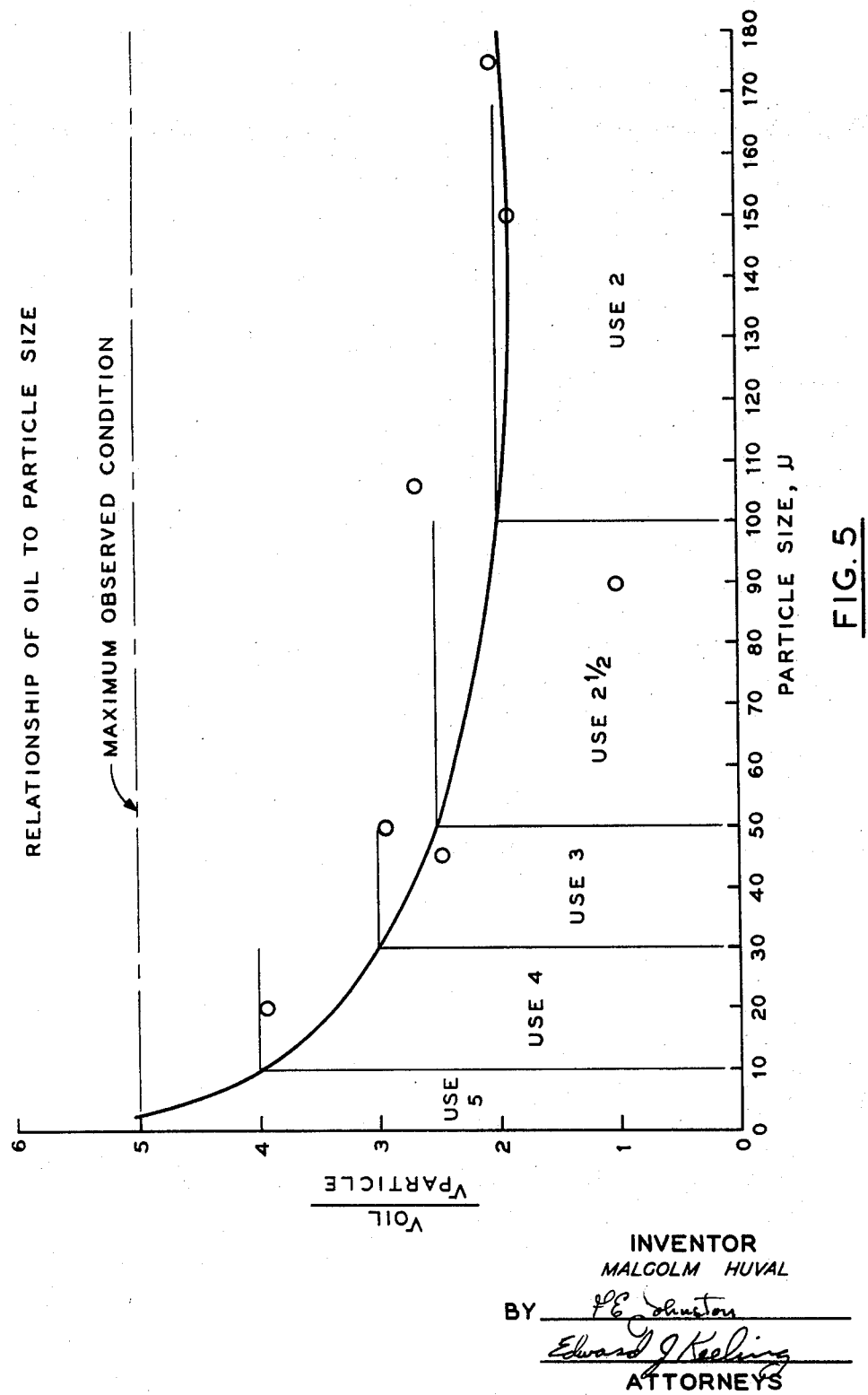
FIGURE 5 is a curve showing the relationship of oil volume to particle size of oil-wet particles.
Figure 7:
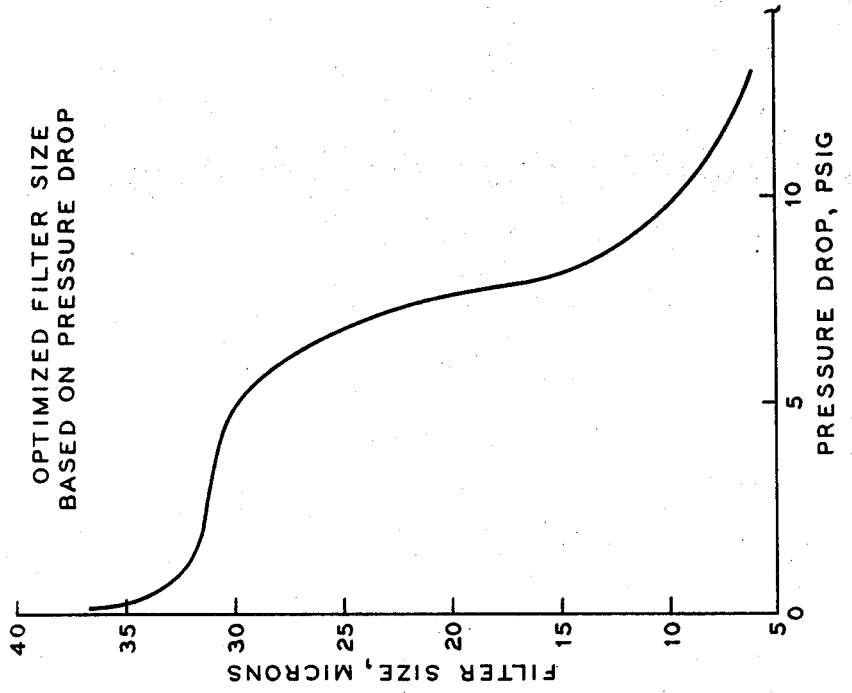
FIGURE 7 is a curve illustrating optimum filter size based on pressure drop.

In a demonstration conducted to show the advantages of the present invention, a waste water stream from a heater treater located on an offshore oil-producing platform in the Gulf of Mexico was directed through apparatus similar to the apparatus illustrated in FIGURE 1. The waste water was salt water and contained at different times from 75 to 500 p.p.m. oil and a solid load of from 40–50 p.p.m. The oil was about 32–33 gravity. The solid size range and distribution is shown below in Table I. Data set out in the table include the number of particles in a particular size range, the particle volume, the total volume of the particles in the particular size range, the volume in percentage of total volume, the volume of oil divided by volume of the particles, the volume of oil adhering to the particles and the percentage of the volume of oil adhering to each size range of particles in relation to the total volume of oil adhering to the particles. FIGURE 5 graphically shows the relationship of the oil volume to the particle size of the oil-wet particles.

TABLE I

| Particle Size, $\mu$ | Number | Particle Vol., $\mu^3$ | Total Volume, $\mu^3$ | Volume, percent | Volume of Oil/Volume of Particle | Volume of Oil, $\mu^3$ | Volume, percent |
|---|---|---|---|---|---|---|---|
| ½ | 210 | 0.065 | 14 | 0.005 | 5 | 70 | 0.010 |
| 1 | 41 | 0.524 | 21 | 0.008 | 5 | 105 | 0.015 |
| 1½ | 15 | 1.767 | 27 | 0 010 | 5 | 135 | 0.019 |
| 2 | 9 | 4.18 | 38 | 0.014 | 5 | 190 | 0.028 |
| 2½ | 1 | 8.18 | 8 | 0.003 | 5 | 40 | 0.006 |
| 3 | 11 | 14.13 | 155 | 0.058 | 5 | 775 | 0.109 |
| 4½ | 2 | 47.70 | 95 | 0.037 | 6 | 475 | 0.068 |
| 6 | 3 | 113 | 339 | 0.13 | 5 | 1,695 | 0.24 |
| 8 | 4 | 268 | 1,072 | 0.40 | 5 | 5,360 | 0.75 |
| 9 | 7 | 380 | 2,665 | 1.00 | 5 | 13,325 | 1.87 |
| 10 | 2 | 523 | 1,047 | 0.39 | 5 | 5,235 | 0.73 |
| 11 | 1 | 695 | 696 | 0.29 | 5 | 3,480 | 0.49 |
| 12 | 3 | 905 | 2,715 | 1.03 | 4 | 10,860 | 1.52 |
| 14 | 3 | 1,436 | 4,308 | a 1.63 | 4 | 17,232 | b 2.42 |
| 20 | 1 | 4,188 | 4,188 | 1.58 | 4 | 16,752 | 2.35 |
| 30 | 2 | 14,135 | 28,270 | 10.55 | 3 | 84,810 | 11.90 |
| 75 | 1 | 220,846 | 220,846 | c 82.88 | 2½ | 552,115 | d 77.47 |
| Totals | 316 | 266,504 | 265,964 | 100.00 | | 712,714 | 100.00 | a $\Sigma=4.99\%$   b $\Sigma=8.28\%$   c $\Sigma=95.01\%$   d $\Sigma=91.72\%$.

Figure 6:
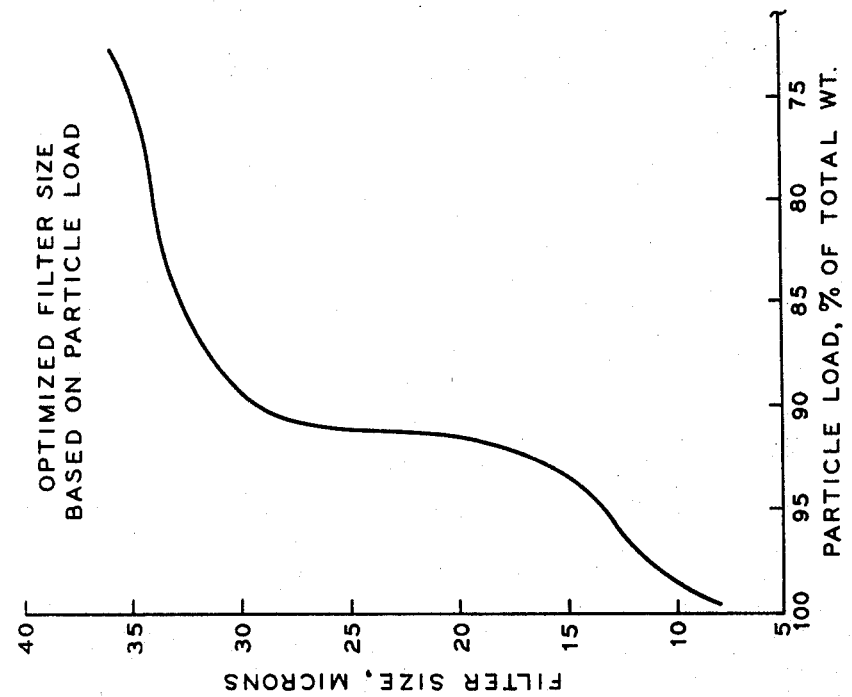
FIGURE 6 is a curve illustrating optimum filter size based on solids in a waste water stream.

The above breakdown of particle size distribution and oil content was determined by means of obtaining three samples from the salt water discharge of the heater treater and examining these samples under a microscope. Fifty fields of examination were viewed. From the analysis shown in Table I, it is clear that the majority of the particles (210 out of 316) are less than 1 micron in size and actually about ½ micron in size. The total volume distribution of the particles in each range of sizes is determined by assuming that the particles are spheres and then multiplying the size by the number of particles in the size range. From these calculations it can be seen that 95 percent of the volume of particles occurred from particles 20 microns and larger. It is possible that due to limitations of sampling and analysis that many of the particles over 20 microns in size might not have been present in the analysis. However, even if this had occurred, this would only increase the 95 percent figure and lower the 5 percent figure for solids less than 20 microns. In other words, the samples examined were representative of the finer particles of less than 20 microns, but not necessarily representative of the very large particles. As noted, the volume of solids less than 20 microns is at a maximum less than 5 percent of the total volume of solids. The oil held by this volume of solids is at a maximum 8 percent of the total oil. Laboratory analysis indicated that ⅓ of the total oil-wet solids are oil and the rest solids. Microscopic analysis, on the other hand, indicated that ½ of the total oil-wet solids are oil and the rest solids. Since the total solid load is 43–44 p.p.m. then the oil load on these solids is either (depending on the analysis) 22 p.p.m. or 44 p.p.m. The small droplets of oil in the carrier water amount to from 10 to 12 times the amount of oil that is carried by the solids. In the particular demonstration the primary filter was sized relatively "sharp-edged" between 15 to 20 microns. The choice of optimum filter size in relationship to percentage of particle load is illustrated graphically in FIGURE 5. FIGURE 6 shows optimum filter size as a function of pressure drop. Selecting a primary filter sized between 15 and 20 microns allowed a maximum of 5 percent by volume of the solids, which is equal in this instance to 98 percent of the total solids by number, and 8 percent of the adhered volume of oil, or 1.75–3.4 p.p.m. of oil, depending on the analysis, to pass through the filter section and then through the coalescing elements. Actual field analysis of the waste water stream revealed that the oil content was 3.0 p.p.m. This volume of oil can be easily tolerated in the disposable water.

Although only a few specific embodiments of the present invention have been described in detail, the invention is not to be limited to such specific embodiments but rather by the scope of the appended claims.

I claim:
1. Method of removing oil droplets from a waste water stream containing suspended solid particles so that the waste water may be disposed of without causing oil pollution comprising the steps of sampling a waste water stream to obtain a representative sample of the waste water including the solid particles suspended therein, determining the amount and the size distribution of the solid particles, establishing the volume of oil that can be carried on each size of the solid particles, selecting an allowable oil concentration of the water for disposal such that oil pollution will not result, relating the allowable oil concentration in the disposable water to the volume of oil that can be carried on the particles which can remain in the disposable water and still not result in oil pollution to select a maximum size of particles which can remain in the water when it is disposed of, removing from the waste water stream particles larger than said maximum size of particles, passing the waste water stream including particles smaller than said maximum size of particles through a coalescing element to coalesce the oil droplets to provide for separation of oil and the water and disposing of the resulting water.

2. The method of claim 1 where the oil content of the disposable water is less than 30–35 p.p.m.

References Cited

UNITED STATES PATENTS

| 2,468,382 | 4/1949 | Taylor | 210—23 X |
| 2,707,563 | 5/1955 | Kasten et al. | 210—23 X |
| 2,933,191 | 4/1960 | Rohr | 210—23 X |

REUBEN FRIEDMAN, Primary Examiner

JOHN ADEE, Assistant Examiner

U.S. Cl. X.R.

210—73